J. J. GILBERT.
MANUFACTURE OF STARCH.
No. 65,664.                     Patented June 11, 1867.
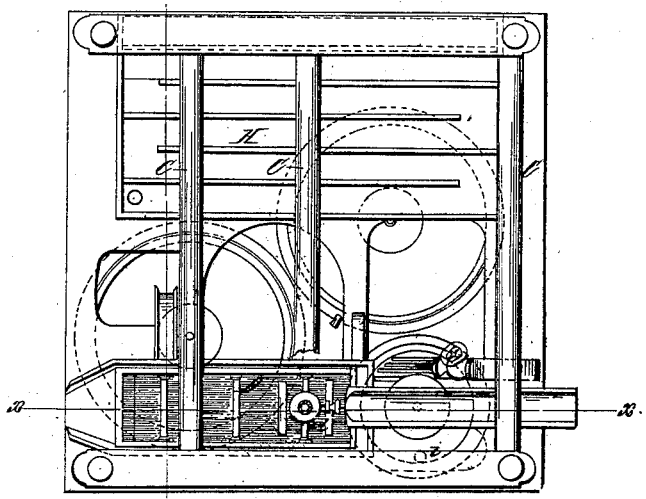
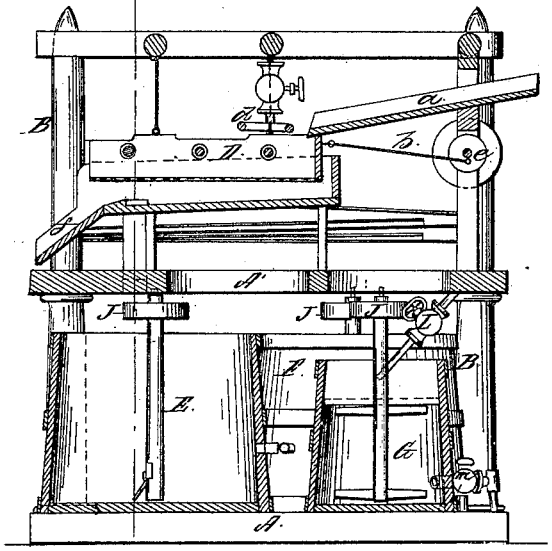

2 Sheets—Sheet 2.

J. J. GILBERT.
MANUFACTURE OF STARCH.

No. 65,664.          Patented June 11, 1867.

Witnesses:

Inventor:

UNITED STATES PATENT OFFICE.

J. J. GILBERT, OF LITTLE FALLS, NEW YORK.

IMPROVEMENT IN THE MANUFACTURE OF STARCH.

Specification forming part of Letters Patent No. 65,664, dated June 11, 1867.

*To all whom it may concern:*

Be it known that I, J. J. GILBERT, of Little Falls, in the county of Herkimer and State of New York, have invented a new and useful Improvement in Manufacturing Starch; and I do hereby declare that the following is a full, clear, and exact description thereof, which will enable others skilled in the art to make and use the same, reference being had to the accompanying drawings, forming part of this specification.

This invention relates to a new and improved method of manufacturing starch, and to the particular manner in which the grain from which the starch is made is manipulated and operated upon during the process; and it consists in providing a separator and vats which contain agitators, and also in a series of connected troughs, called a "depositor," as will be hereinafter more fully explained.

Figure 3:
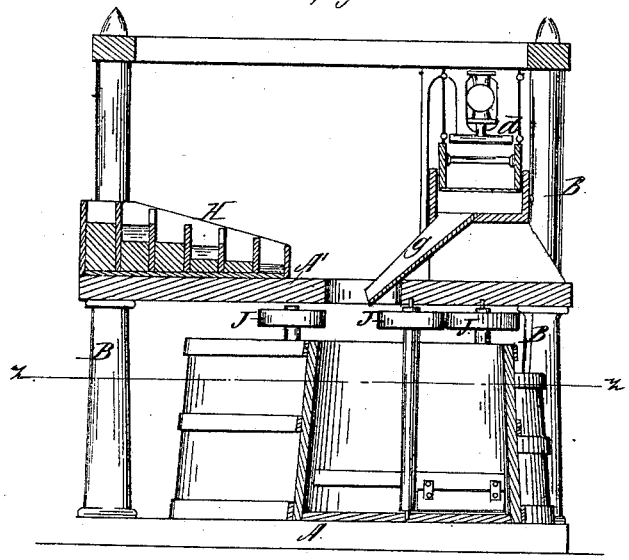
Figure 4:
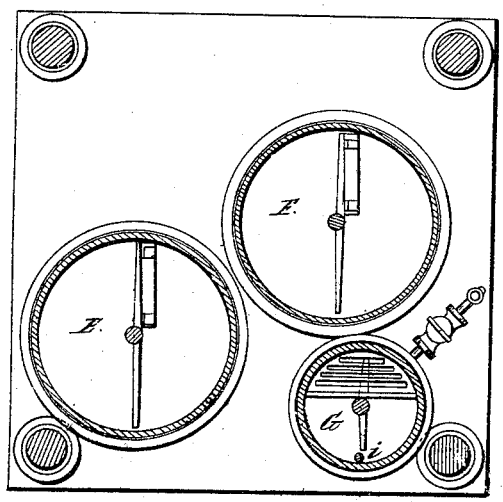

Figure 1 represents a plan or top view of the apparatus. Fig. 2 is a vertical sectional elevation through the line $x\,x$ of Fig. 1. Fig. 3, Sheet 2, is a section of Fig. 1 through the line $y\,y$. Fig. 4 is a horizontal section through the line $z\,z$ of Fig. 3.

Similar letters of reference indicate like parts.

The combination and arrangement represented in the drawings embrace the most important parts of the apparatus used in the manufacture of the starch from the grain. The drawings represent the separate floors or stories of a starch-factory where such business is pursued, the floors being broken away somewhat for the purpose of showing the apparatus to better advantage.

A A' represent the floors of the building.

B represents the pillars or posts of the building.

C represents the upper joists or beams.

D, Figs. 1 and 2, is the separator.

E, F, and G represent vats.

H is the depositor.

J J J represent pulleys on the ends of vertical shafts in the vats, to which the wings or arms are attached which form the agitators.

The ground or prepared grain is discharged into the separator D by the spout $a$. The separator receives a longitudinal motion from the rod or pitman $b$, which is attached to the separator and to a crank-pulley. (Seen at $e$.)

The separator is a rectangular-shaped box, with wooden ends and sides suitably secured together, and with a bottom of bolting-cloth of suitable fineness. It is suspended from above by rods, upon which it is vibrated by the pitman $b$, as before described.

Immediately above the separator is seen the water-pipe $d$, with a globe-valve to regulate the supply. The water flows from the under side of the cross-pipe, which is perforated for the purpose, which assists in washing the finer portions of the stock through the bolt, while the coarser grains are carried over the end and down the broad spout $f$. The separator vibrates in a box of corresponding shape, which has the spout $f$ attached to its outer end; and it has another spout attached to its side, which is seen in Fig. 3, marked $g$. This spout $g$ conveys the stock which passes through the bolt into the vat E. This vat is large enough to contain the product of one day's work, which product is allowed to settle over night. The next morning the water is drawn off by removing a plug in the side of the vat. The plug is then replaced, and a solution of caustic alkali is introduced, the proportion being sixty pounds of alkali to the stock from sixty bushels of grain to one thousand gallons of water. The agitator in the vat is now started and kept in motion about six hours. In the meantime the vat F is receiving the products of the separator to be operated upon the following day. The contents of the vat E are now pumped up into the highest part of the depositor H. The depositor is composed of a series of inclined parallel spouts or troughs, which descend longitudinally, and which are connected with each other in such a manner that liquid poured into the upper spout is discharged into the lower one. The gluten of the grain, being dissolved by the alkali in the vat, flows off, while the starch is deposited nearly pure. The starch is now taken from the depositor and thrown onto the wooden grate $h$ in the small vat G, where, in combination with a stream of water which is let on, it is washed through the grate, to be acted upon by the agitator in the vat. After being agitated a suitable length of time it is allowed to rest for a while, when a valve is opened, and it is allowed to flow into the settling-vats below, where it is drained as usual. The pipe of the valve through which the starch is drained off is about three inches from the bottom of the vat, so that a stratum of starch is left, which contains some impurities. This is drawn through a hole in the bottom of the vat by raising the plug from the hole *i*.

L is the water-cock for the vat G. *m* is the valve-cock through which the pure starch is drawn from the vat.

Having thus described my invention, what I claim as new, and desire to secure by Letters Patent, is—

1. The separator D, constructed and arranged substantially as herein shown and described, for the purposes set forth.

2. The depositor H, constructed substantially as described, for the purposes set forth.

3. In combination with the separator, the vats arranged substantially as described, and the method herein described of manufacturing starch.

J. J. GILBERT.

Witnesses:
CHARLES OYSTON,
WM. M. DORR.